United States Patent [19]

Kellstrom et al.

[11] 3,990,753
[45] Nov. 9, 1976

[54] ROLLER BEARINGS COMPRISING ROLLERS WITH POSITIVE SKEW ANGLE

[75] Inventors: Erik Magnus Kellstrom, Partille; Leif Sigvard Blomqvist, Goteborg, both of Sweden

[73] Assignee: SKF Industries, Inc., King of Prussia, Pa.

[22] Filed: Feb. 27, 1976

[21] Appl. No.: 661,870

Related U.S. Application Data

[63] Continuation of Ser. No. 497,268, Sept. 14, 1974, abandoned, which is a continuation of Ser. No. 377,124, July 6, 1973, abandoned.

[52] U.S. Cl. .............................. 308/214; 308/202; 308/207 R
[51] Int. Cl.² ................... F16C 19/00; F16C 33/00
[58] Field of Search .......... 308/194, 212, 213, 214, 308/202

[56] References Cited
UNITED STATES PATENTS

| 1,862,641 | 6/1932 | Turner | 308/216 |
|---|---|---|---|
| 1,918,677 | 7/1933 | Winquist | 308/194 |
| 1,967,650 | 7/1934 | Ahmansson | 308/216 |
| 3,370,900 | 2/1968 | Messerschmidt | 308/212 |

FOREIGN PATENTS OR APPLICATIONS

| 977,603 | 11/1950 | France | 308/190 |

Primary Examiner—Robert R. Song
Assistant Examiner—Richard A. Bertsch
Attorney, Agent, or Firm—Howson and Howson

[57] ABSTRACT

A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause at least the rolling elements in the load zone to assume a nonnegative skew angle within a predetermined angular range; said rolling elements having a skew angle when the rolling element axis and the axis of the bearing are not coplanar and said skew angle being positive when the friction force components in the axial direction arising in each contact between a rolling element and said raceways and acting on the rolling element are so directed that they add onto or are codirectional to the axial component of the normal contact force load carried by said rolling element at that contact. Also, a bearing having the skew angle so selected that the friction forces arising from the skewed roller position act to reduce the magnitude of the normal contact forces between roller and raceways.

30 Claims, 37 Drawing Figures

FIG.I.
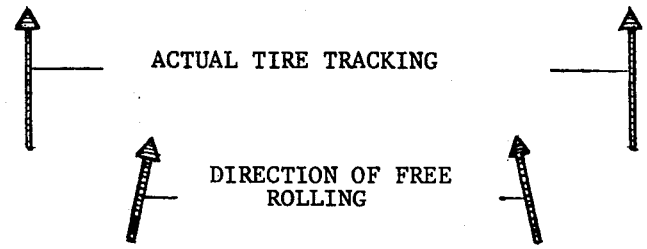
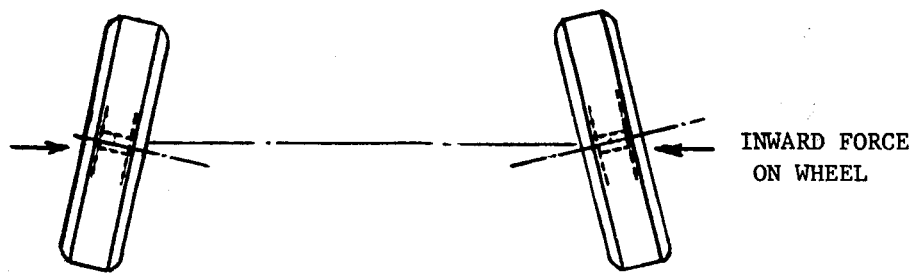
FIG.1ª.
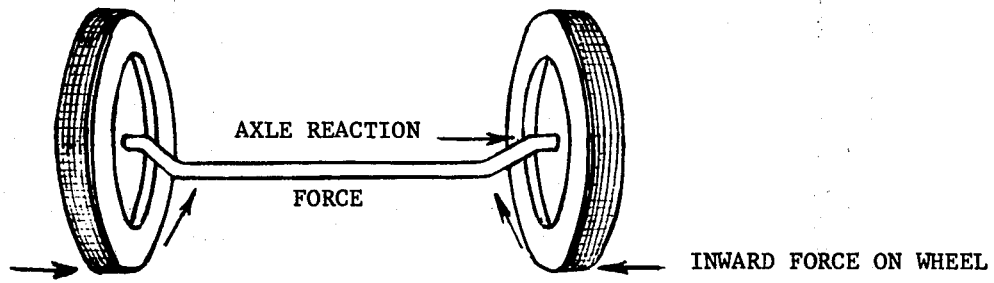

FIG.11.
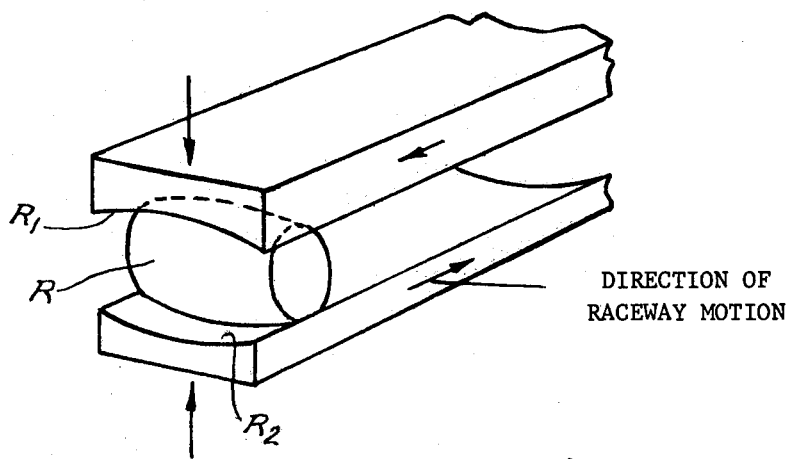
DIRECTION OF RACEWAY MOTION
FIG.12.
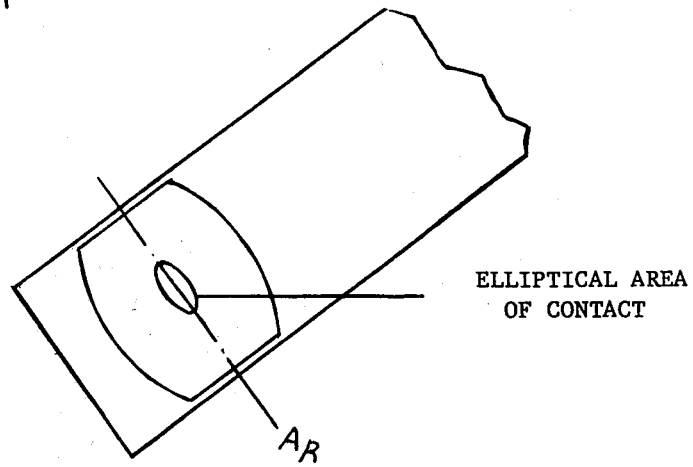
ELLIPTICAL AREA OF CONTACT
FIG.13.
LINEAR RACEWAYS
  OUTER CONTACT AREA
  INNER CONTACT AREA

MAJOR AXIS OF
CONTACT ELLIPSE

ROLLING RADIUS r

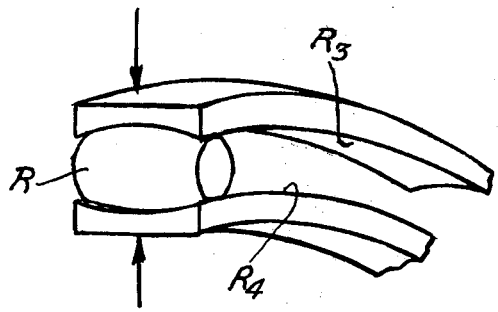
FIG. 16
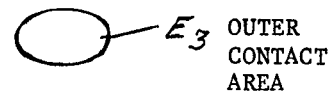
FIG. 17.
RING RACEWAYS
$E_3$ OUTER CONTACT AREA
$E_4$ INNER CONTACT AREA
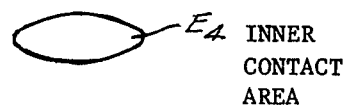
$A_R$ AXIS OF RING CURVATURE
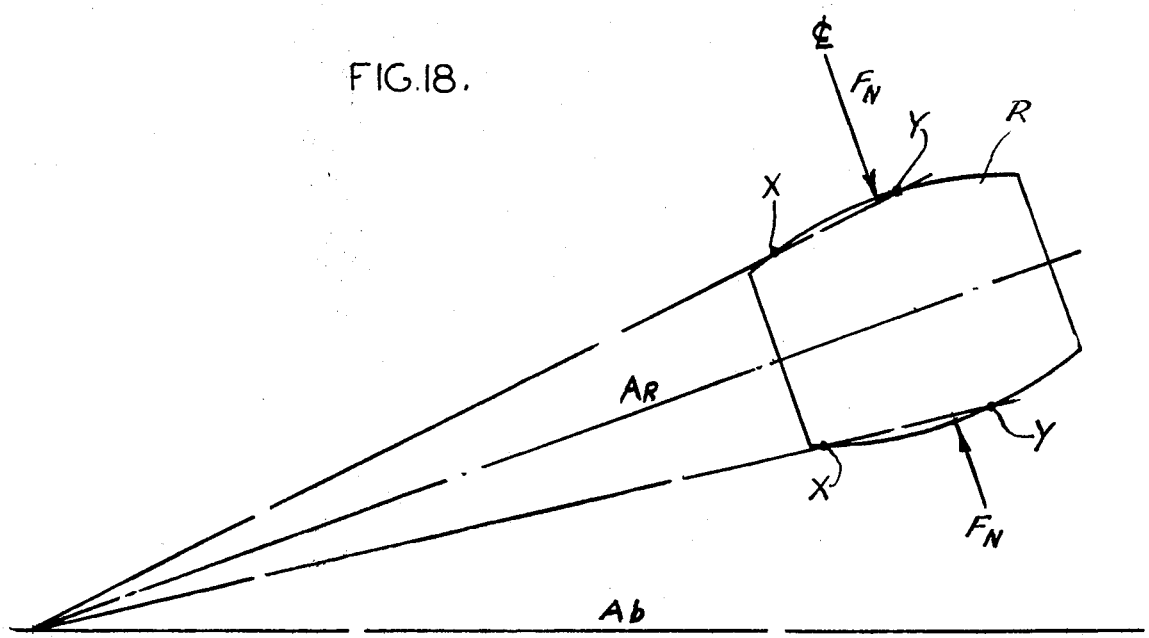
FIG. 18.

PRESSURE DISTRIBUTION ON
CONTACT AREA

ELLIPTIC CONTACT AREA

SLIP PATTER IN
CONTACT AREA

FRICTION FORCE
DISTRIBUTION
ON CONTACT

FRICTION FORCES WHICH GIVE
RISE TO FRICTION MOMENT

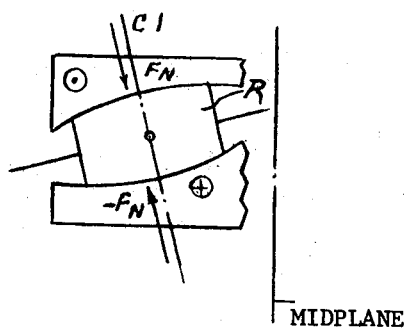
FIG. 21a
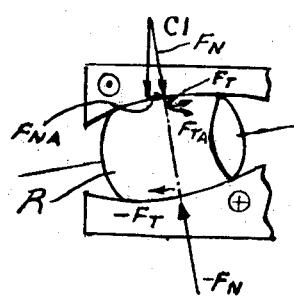
FIG. 21b
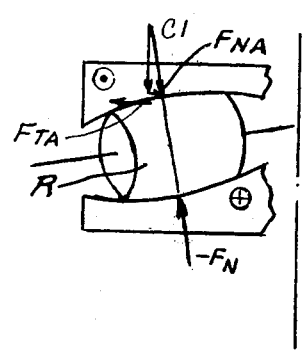
FIG. 21c
MIDPLANE
FIG. 22a
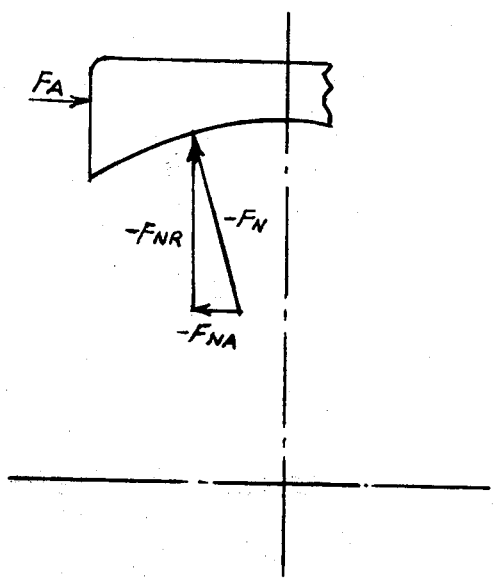
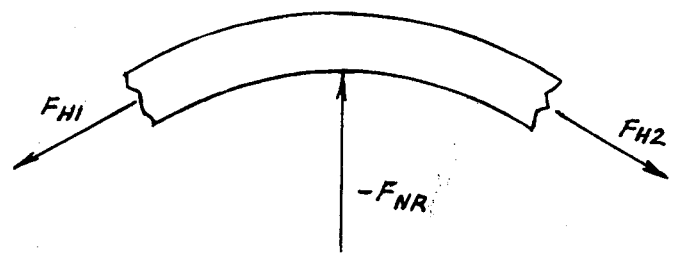
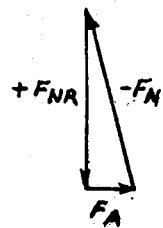
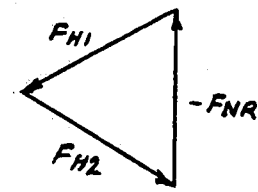

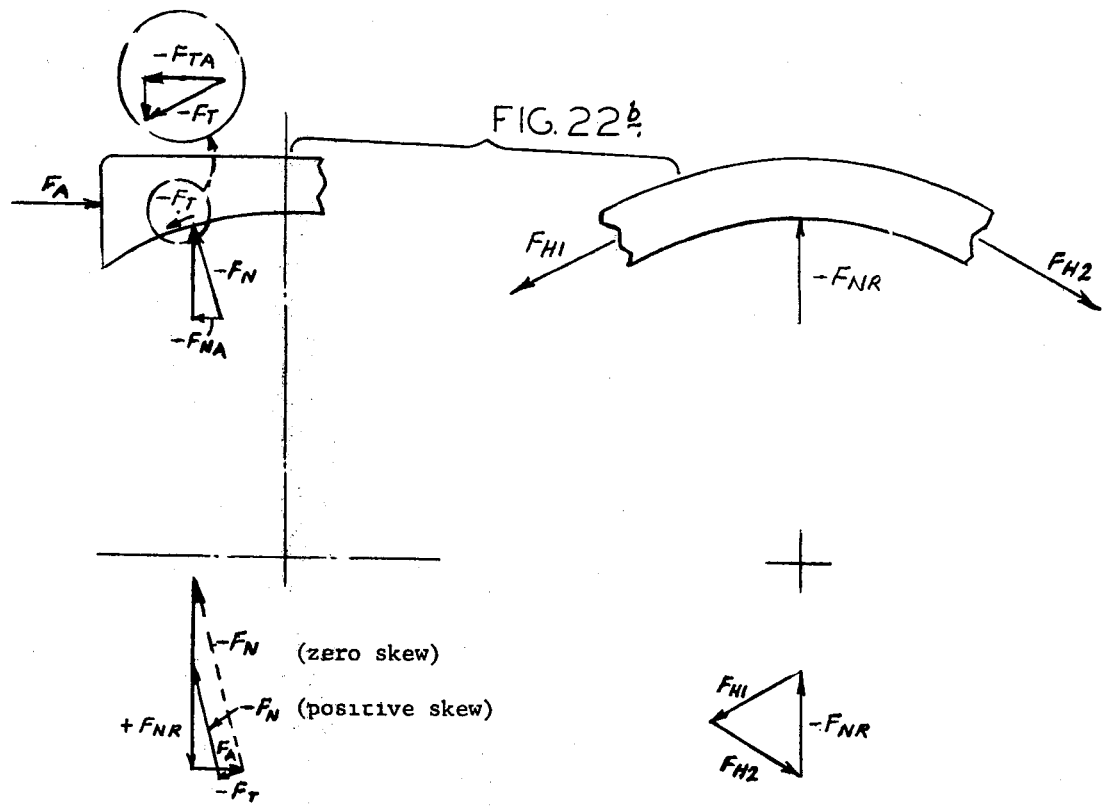
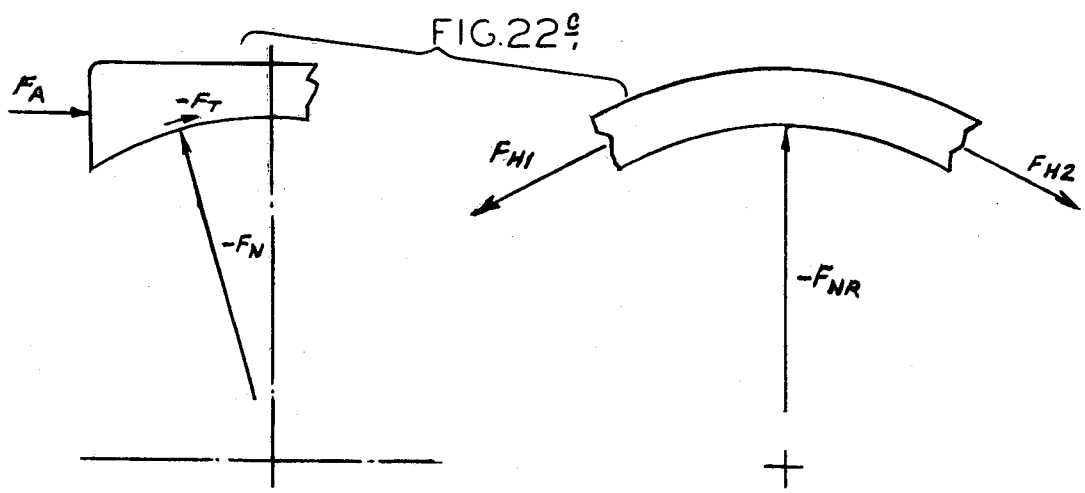
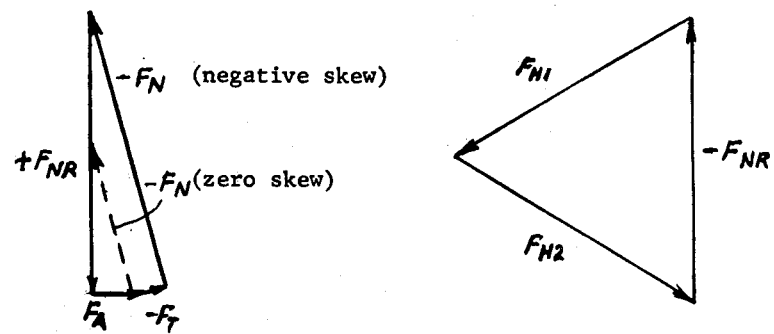

FIG. 23a
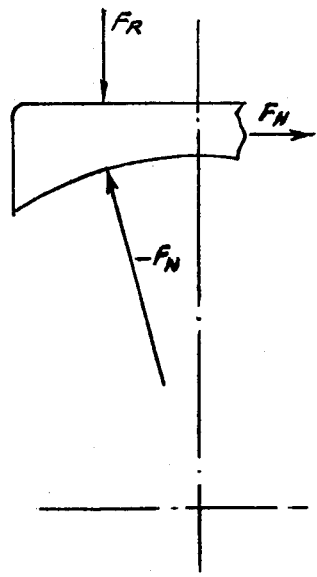
FIG. 23b
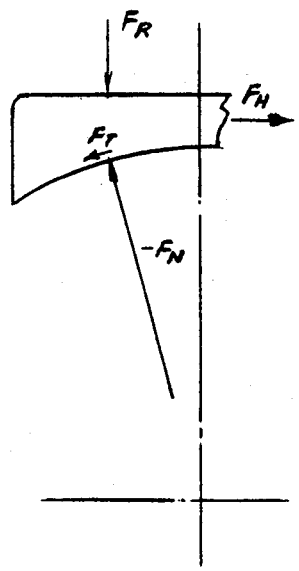
FIG. 23c
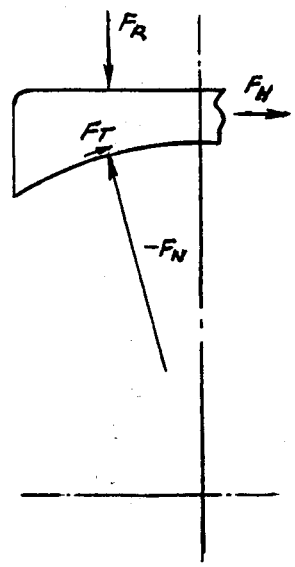
FIG. 24a
FIG. 24b
FIG. 24c
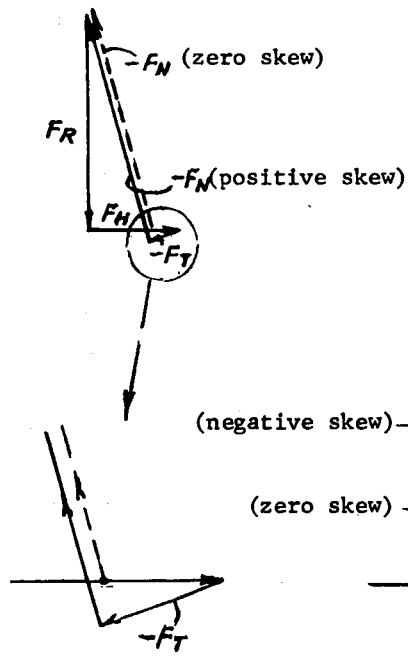
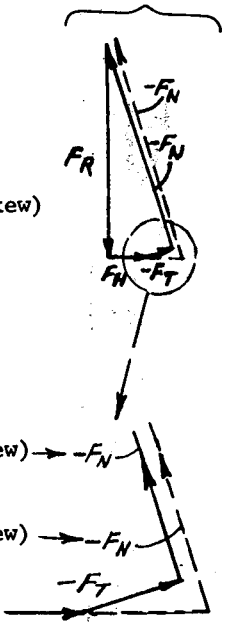

OVERALL FRICTION TORQUE OF DOUBLE ROW SPHERICAL ROLLER BEARINGS UNDER THRUST LOAD AS A FUNCTION OF ROLLER SKEW ANGLE.

ROLLER BEARINGS COMPRISING ROLLERS WITH POSITIVE SKEW ANGLE

This application is a continuation of our prior application, Ser. No. 497,268 filed Aug. 14, 1974, and now abandoned, which in turn was a continuation of our prior application, Ser. No. 377,124 filed July 6, 1973 and now abandoned.

The present invention relates to roller bearings and particularly to structures for effecting roller skew control.

Roller bearings are designed to accommodate both axial and radial forces by employing various structural features. For instance, some bearings may have a plurality of rows of rollers. It is common practice for the rollers in this type of bearing to be guided by means of a flange or a loose guide ring. The rollers thus contact the outer ring, the inner ring, and the cage as well as the flange or guide ring. As a result, several friction points exist on each rolling member. In operation, the rollers in such bearings normally assume a certain angle relative to the rolling direction so that as a consequence rolling and sliding in a direction parallel to the roller axis occurs at the same time.

In operation of a bearing under load, a skewed roller attempts to deviate from a track defined by the geometric raceways and in so doing gives rise to slip forces which may or may not be beneficial to the overall force balance within the bearing. The action of a skewed roller is somewhat analagous to the combined rolling and sliding of the toed-in front wheels of a motor vehicle. (See FIGS. 1 and 1a). Each wheel tends to roll in its own straight line. These lines of rolling converge; however, the geometrically fixed separation of the wheels requires that the actual paths over the road surface be parallel. Thus, lateral slip must occur, and this in turn produces inwardly directed friction forces on the tires.

During operation of the bearings, the angle which the rolling elements assume is termed the skew angle, and the skew angle is defined as the angle between the axis of rotation of the rolling element and a plane normal to the path of relative motion of the raceways confronting the rolling elements. FIG. 2 shows a skewed roller in a conventional spherical roller bearing. The inner ring $R_i$ is assumed to move inwards and the outer ring $R_o$ outwards and the roller center is stationary. Because of the skew, the roller surface will have a sliding velocity component in the axial direction at its contact with the ring, see for instance points A and B and the velocity component $V_a$ of the roller at the inner ring. Therefore, an axial friction force $f_a$ will act on the inner ring and rollers. In the case shown, the axial components of the friction forces acting on the roller act at both contacts between rings and rollers in a direction opposite to the axial load component of the normal contact force acting on the roller in the same contact. If the direction, or sign, of the skew angle changes, the axial friction forces will change their direction at both roller/ring contacts. The skew angle is defined as being positive when the friction force components acting on the roller in the axial direction are so directed that they add onto or are codirectional to the axial component of the normal contact force acting on the roller at the same contact. The terms "codirectional" and "add onto" as used herein are considered interchangeable and of the same meaning. The skew angle is also defined to be positive when the friction force components on a raceway in the axial direction are so directed that they counteract the axial load component of the external load acting on said raceway. The friction forces on the rolling element in a given contact are opposite in direction to that on the raceway of that contact.

In a conventional roller bearing, the rollers tend to assume a negative skew angle producing friction forces wherein the axial component of these friction forces arising in a contact between the rolling element and raceway and acting on the rolling element is so directed as to counteract or substract from the axial component of the normal contact load acting on the rolling element in the same contact. It has been determined that, for bearing load conditions which contain substantial axial components, negative skew angles result in higher friction losses and lower bearing life than corresponding positive skew angles. Accordingly, a roller bearing wherein the skew angle of the rollers is controlled so as to be zero or positive is highly desirable.

It is a primary object of the present invention to provide roller bearings having a minimum amount of friction and a maximum service life over the broadest range of axial and radial load combinations.

Skew control may be broadly defined as positioning the rolling elements in such a manner that the rolling element axis and bearing axis are not coplanar and the friction forces acting on said element in the contacts arising between the rolling elements and both raceways reduce some of all of the normal contact forces acting on the rolling element below the magnitude which obtains when the rolling element is unskewed.

The present invention achieves this by providing a novel roller bearing wherein the skew angle of the rolling elements is zero or positive, i.e., non-negative.

This, in turn, can be acheived by providing an improved roller bearing wherein the sum of the moments acting on the rolling elements causes the rolling elements to assume a skew angle within a prescribed positive range, including a zero skew angle.

More particularly, the aforementioned object can be achieved by designing the bearing in such a way that the so-called skew moment of friction forces from one ring acting to cause positive skew of the rolling element predominates over or is equal to the skew moment of friction forces from the other ring acting to cause negative roller skew whenever the skew angle is negative so that the operating skew angle of the rolling elements achieved upon equilibrium of the skew moments will be positive or zero.

The invention is described below in connection with a spherical roller bearing, reference being made to the accompanying drawings wherein:

FIGS. 1 and 1a are schematic views showing the combined rolling and sliding of toed-in front wheels of a motor vehicle;

FIG. 11 is a fragmentary perspective view of a linear type roller bearing assembly;

FIGS. 12 and 13 show the contact pattern of the roller with the raceway;

FIG. 16 is a fragmentary perspective view of a spherical roller bearing;

FIG. 17 shows the contact pattern of a spherical roller of FIG. 16 with the inner and outer raceways;

FIG. 18 is a schematic showing of an angularly oriented roller of a spherical roller bearing to show the points of pure rolling;

Figure 20:
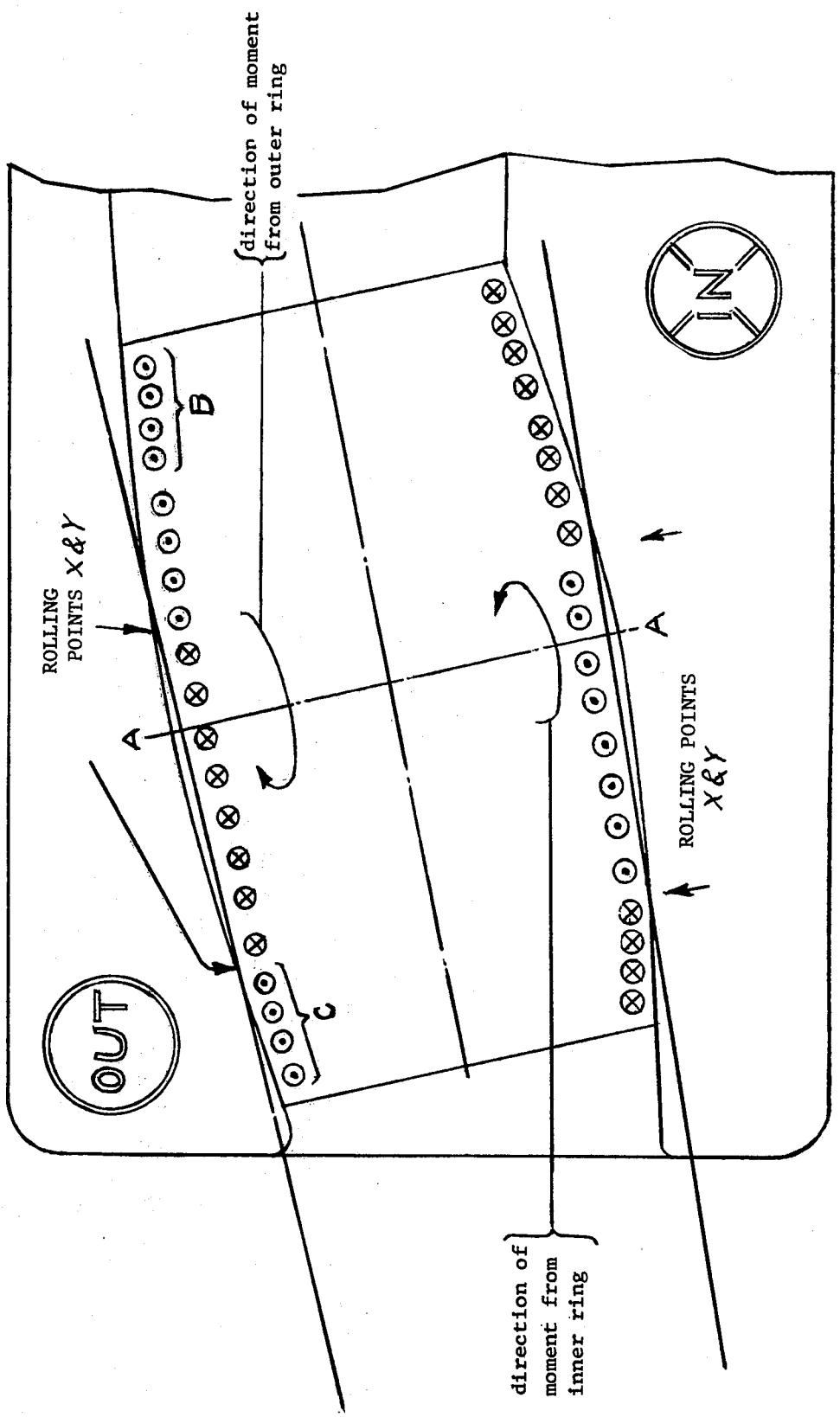
Figure 25:
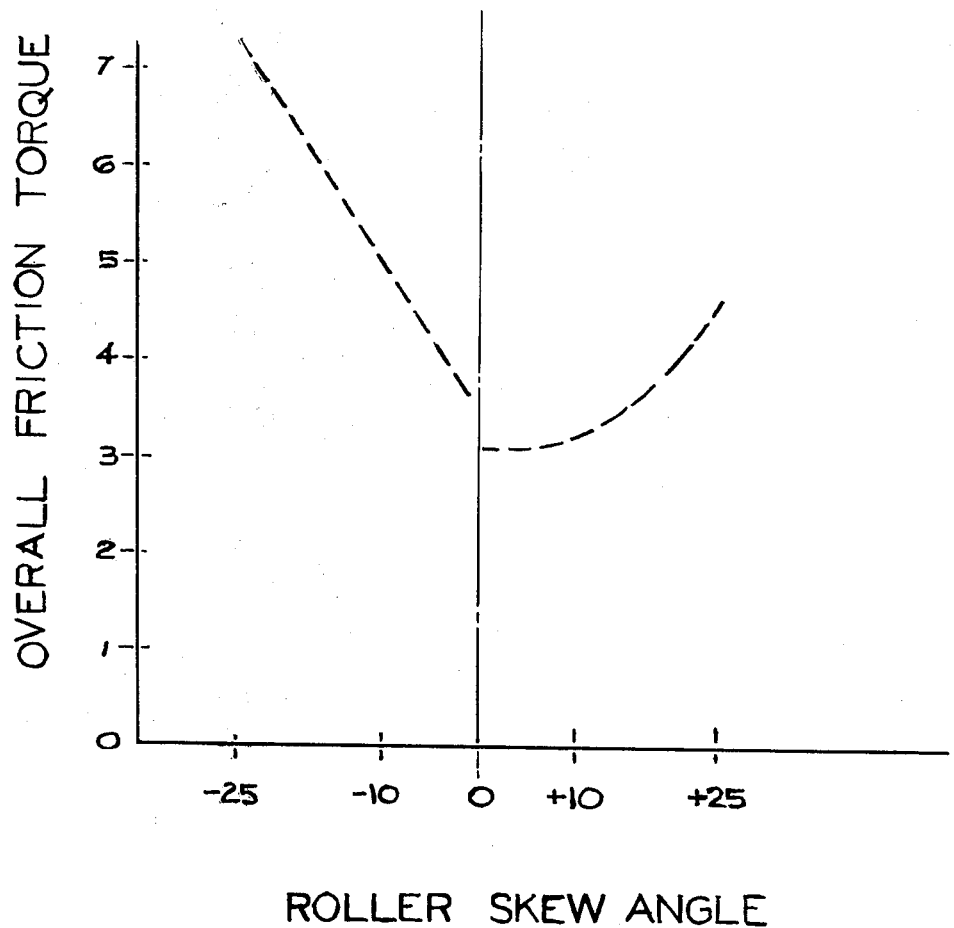

FIGS. 19a–19d inclusive illustrate the general sliding pattern and friction forces of an angularly oriented roller under load;

FIG. 20 illustrates the frictional force patterns for skew moments in an angularly oriented roller;

FIGS. 21a, 21b, and 21c are fragmentary views showing a roller at various skew attitudes;

FIG. 22a shows the pattern of forces on a section of the outer ring in contact with a roller in an assembly of the type illustrated in FIGS. 21a;

FIG. 22b shows the pattern of forces on a section of the outer ring in contact with a roller in an assembly of the type illustrated in FIGS. 21b;

FIG. 22c shows the pattern of forces on a section of the outer ring in contact with a roller in an assembly of the type illustrated in FIG. 21c;

FIG. 23a shows the pattern of forces on a bearing of FIG. 21a under radial load;

FIGS. 23b and 23c show the pattern of forces on a bearing of FIGS. 21b and 21c;

FIGS. 24a, 24b and 24c are force polygons illustrating a skew for the conditions illustrated in FIGS. 23a and 23b and 23c respectively; and FIG. 25 is a chart derived from mathematical analysis of a spherical roller bearing under axial load and at various skew attitudes.

Figure 7:
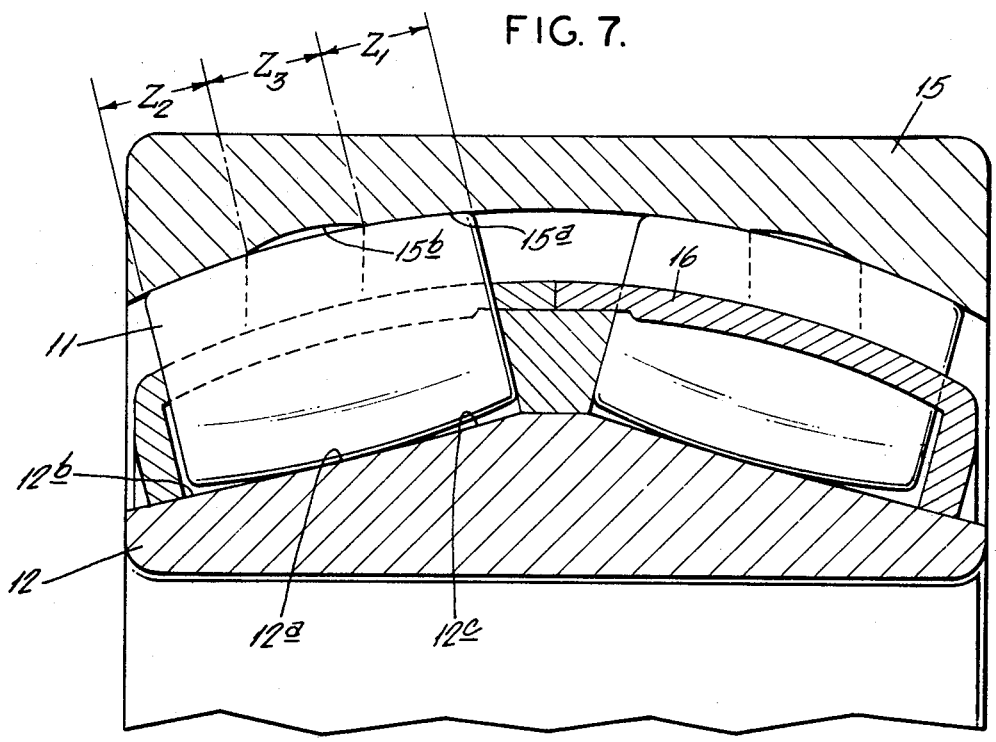
FIGS. 7 and 8 are sectional views similar to FIG. 6 but of modified embodiments of the present invention.

The spacing between the central portion of the outer raceway and the profile of the roller in FIG. 7 and the spacing between the ends of the roller and the chamfered ends of the inner raceway are greatly exaggerated for purposes of illustration only.

Figure 3:
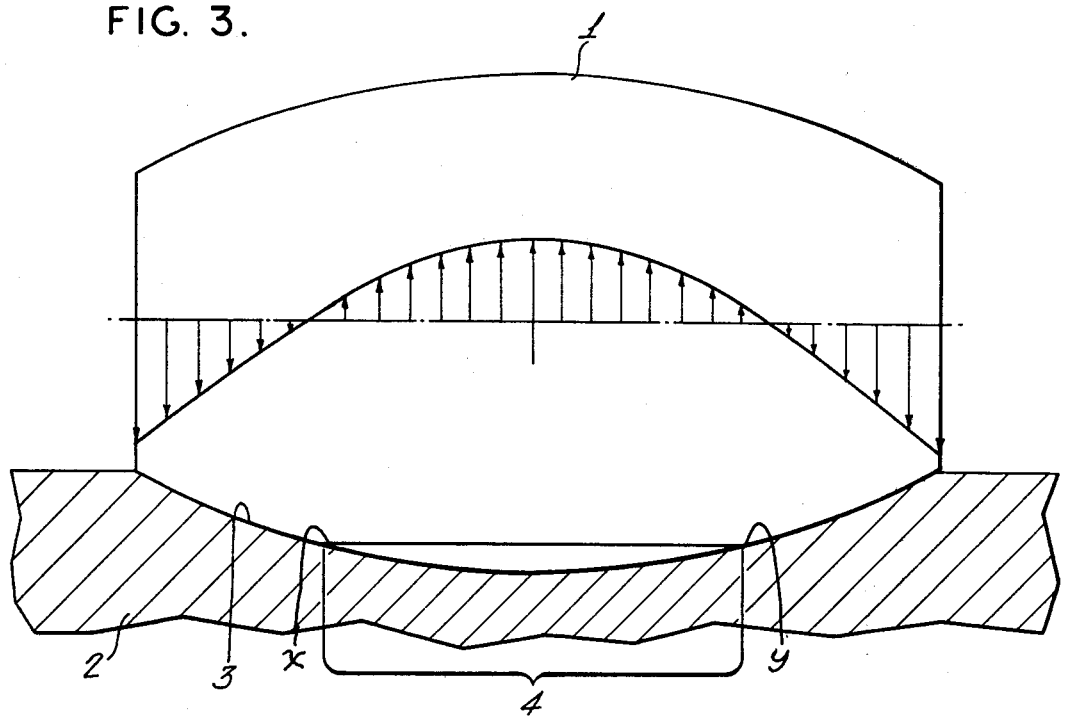
FIG. 3 is a schematic diagram showing relative sliding speeds between a roller and its raceway as viewed from underneath the roller.

Referring now to FIG. 3, a rolling member designated 1 is assumed to roll straight forward (normal to the plane of the drawing) in a raceway 2. The line of contact between the roller 1 and the raceway 2 forms the segment of a circle 3. When the roller moves forward in the raceway, different points along the contact line have different speeds in relation to the raceway, since the speed of a point on that line is determined by the angular speed multiplied by the radius from the center of rotation of the roller. The radius is different at different points; whereas, the angular speed is constant so that the speed of the roller 1 and the speed of the raceway 2 are the same only at the two rolling points indicated at 4, for example. The roller speeds at points between the rolling points 4 are higher than the raceway speed, and the speeds at points on both sides of the rolling points are lower than the raceway speed. Thus, the roller surface area between the two rolling points is subjected to a retarding force; whereas, the roller surface areas on the outsides of the rolling points 4 are subjected to an accelerating force. the corresponding speed difference (the relative sliding speeds) are illustrated schematically in FIG. 3.

Figure 2:
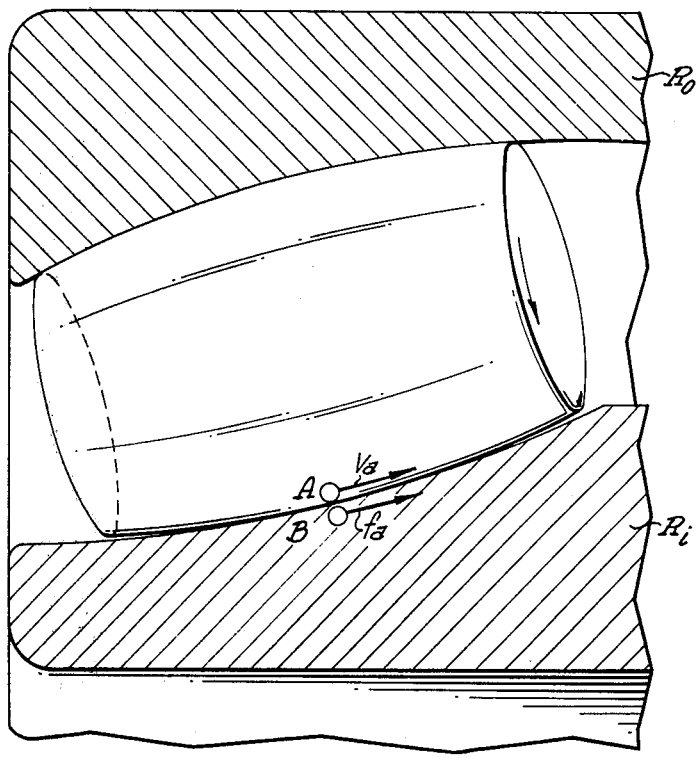
FIG. 2 is a fragmentary sectional view of a portion of a conventional spherical roller bearing.

The sliding of the roller 1 along the raceway 2 generates friction forces between the raceway 2 and the rolling member 1. These friction forces as shown in FIG. 2 are, however, symmetrically distributed relative to the center or median of the roller and do not alter the rolling direction of the roller in relation to the raceway. As a rule, however, the forces acting on the roller in a roller bearing are such that the rolling points 4 are not symmetrical in relation to the center of the roller. In such event, the relative sliding speeds are distributed as shown in FIG. 4.

Figure 4:
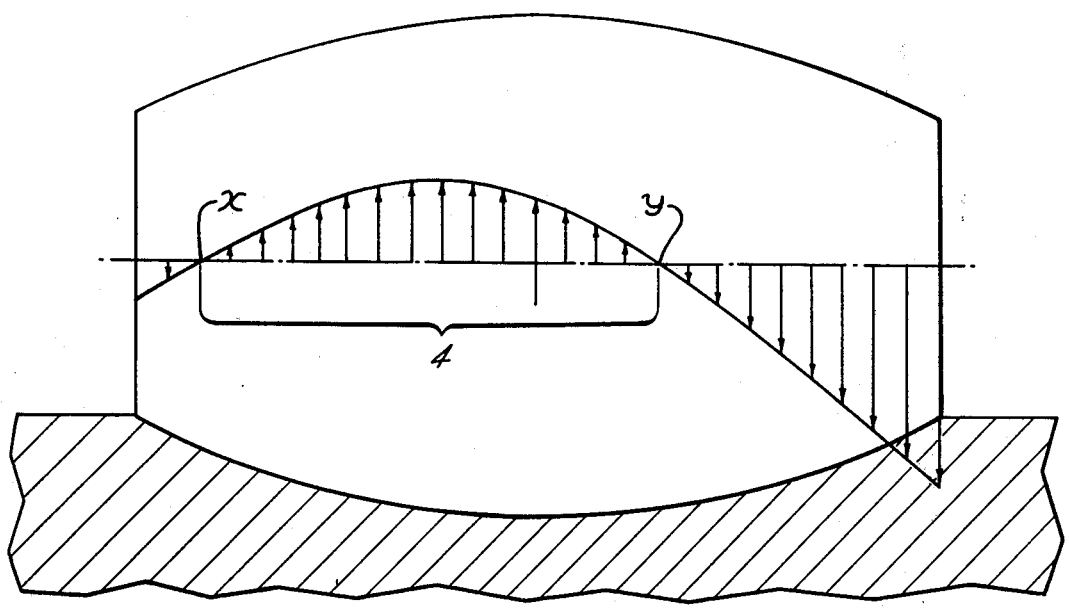
FIG. 4 illustrates the same speeds at displaced points of rolling contact.
Figure 5:
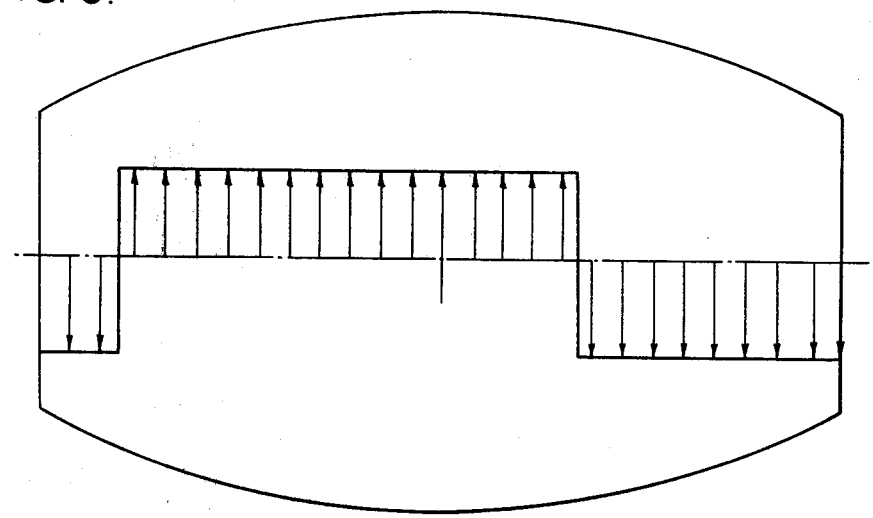
FIG. 5 illustrates schematically the forces which create a skew moment on the roller.

The relative sliding speeds shown in FIG. 4 create friction forces between the roller and the raceway. These forces are shown diagrammatically in FIG. 5. For explanation purposes, it is assumed that the magnitudes of the friction forces are independent of the sliding and that the contact force and the friction coefficient are the same at all points. The sliding friction is thus equally high at all points, with the exception of the rolling points, where it is zero. As clearly shown in FIG. 5, the friction forces are distribted in such a way that they do not neutralize each other; rather they create a moment which tends to skew the roller. This moment is called the skew moment.

Figure 6:
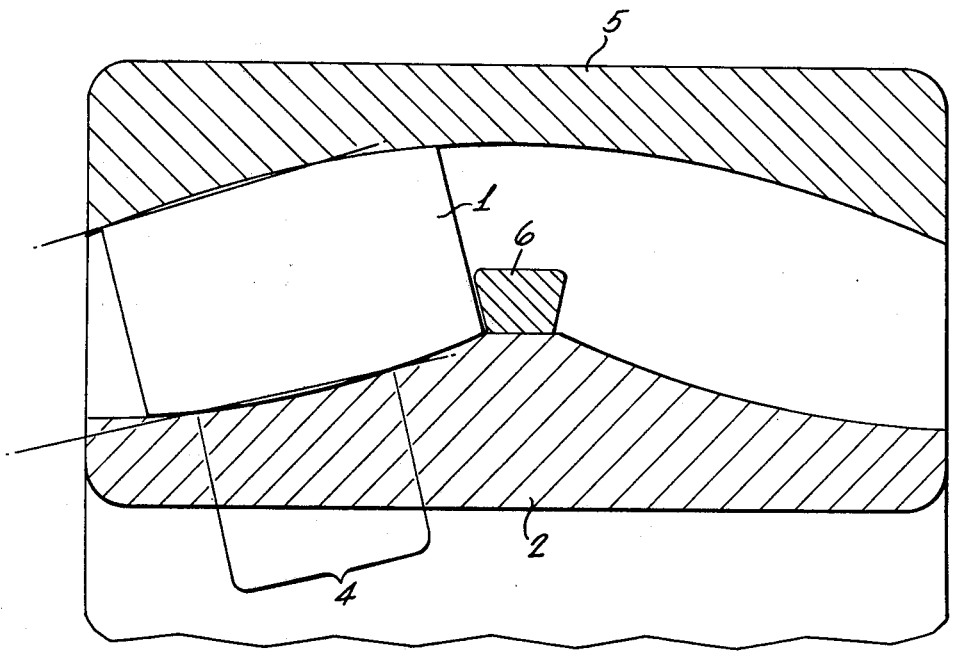
FIG. 6 is a sectional view illustrating a double-row spherical roller bearing, wherein the cage is omitted for the sake of simplicity and only one roller is illustrated.

Schematically illustrated in FIG. 6 is a spherical roller bearing having an inner ring member 2, a rolling member 1, and an outer ring member 5. The rolling points are indicated at 4. In order to simplify the drawing, the cage has been omitted; however, a loose guide ring is indicated at 6.

Assuming for purposes of discussion that the inner ring 2 is moving in a direction away from the reader and the outer ring 5 toward the reader, mathematically it can be proven that the shew moment created by the inner ring tends to skew the roller in the negative direction. The skew moment created by the outer ring is the reverse of that of the inner ring and tends to pivot the roller in the opposite direction.

Since the skew moments are directed opposite to each other, the greatest moment predominates over the other to skew the roller in a certain direction. It is desirable for the roller to be skewed only to such an extent as to cause the skew moments to balance one another with the skew of the roller being unaffected by the cage. This reduces cage forces and thereby cage friction in the bearing.

Mathematically, it is possible to prove that a position or zero skew angle is desirable, particularly in applications where a bearing operates under loads containing a strong axial component, i.e., the positive skew moment should predominate over or be equal to the negative one when the skew angle is negative. The advantages gained by the positive skew angle of the roller under such load conditions are lower friction in the bearing and larger fatigue life due to the same cause. A remarkable achievement is the considerably longer bearing life (2–3 times the normal life) of the bearing.

It has been determined in a bearing with substantial axial loading components, that as the skew angle B increases in a negative sense from zero, contact forces and friction losses, and hence, bearing temperature, increase at a sharp rate. In a spherical roller bearing, it has been determined that friction remains substantially constant and that optimum performance is obtained when the skew angle is in a positive range of between 0° and 2°. At positive skew angles beyond 2°, friction forces increase but at a slower rate than with respect to corresponding negative skew angles and that good performance could be obtained with positive skew angles up to about 6°. Even bearings which are designed for an essentially radial load at times operate under incidental axial loading. Hence, the bearing with optimum performance over the greatest range of load conditions is one which operates with non-negative skew.

Figure 10:
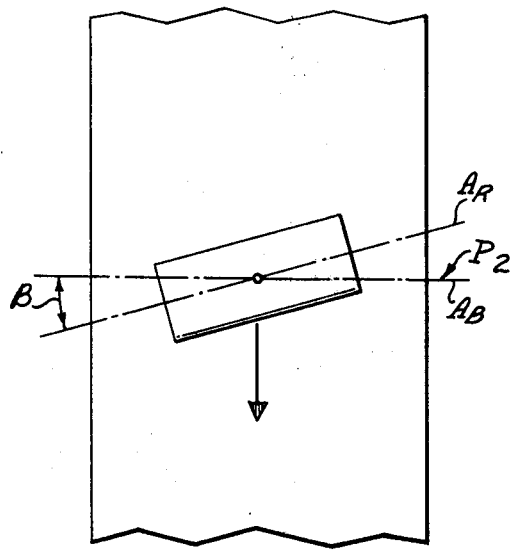
FIG. 10 is a fragmentary plan view showing a rolling element in a skewed position.
Figure 9:
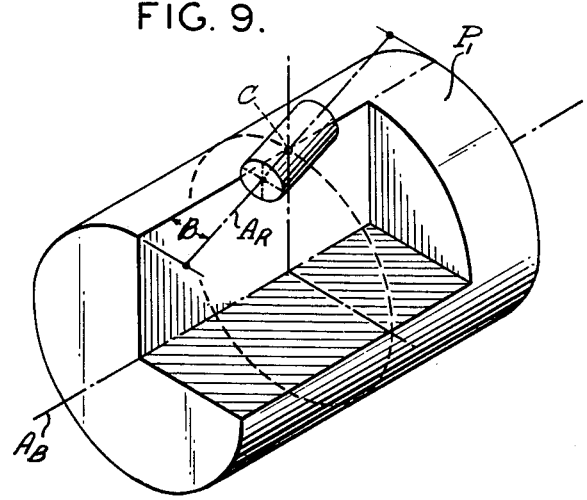
FIG. 9 is a schematic view illustrating skew angle of a rolling element.

With respect to FIG. 9, which shows a rolling element in a skewed position, the skew angle B for a rolling element in an annular bearing as a spherical roller bearing is an angle defined by a geometric axis $A_R$ of the rolling element and a plane through the bearing axis $A_B$ which contains the mid point C on the geometric axis of the rolling element. In other words, the rolling element has a skew angle B when the rolling element axis and the axis of the bearing are not coplanar. With respect to FIG. 10, the skew angle B of a rolling element may be defined as the angle between the axis of rotation $A_R$ of the rolling element and a plane $P_2$ normal to the path of relative motion of the raceways confronting the rolling elements. The skew angle B is positive when the friction component in the bearing axis direction arising in each contact zone between the rolling elements and the raceways and acting on the roller are so directed that they are codirectional to the axial component of the normal force acting on the rolling element in the same contact.

Figure 8:
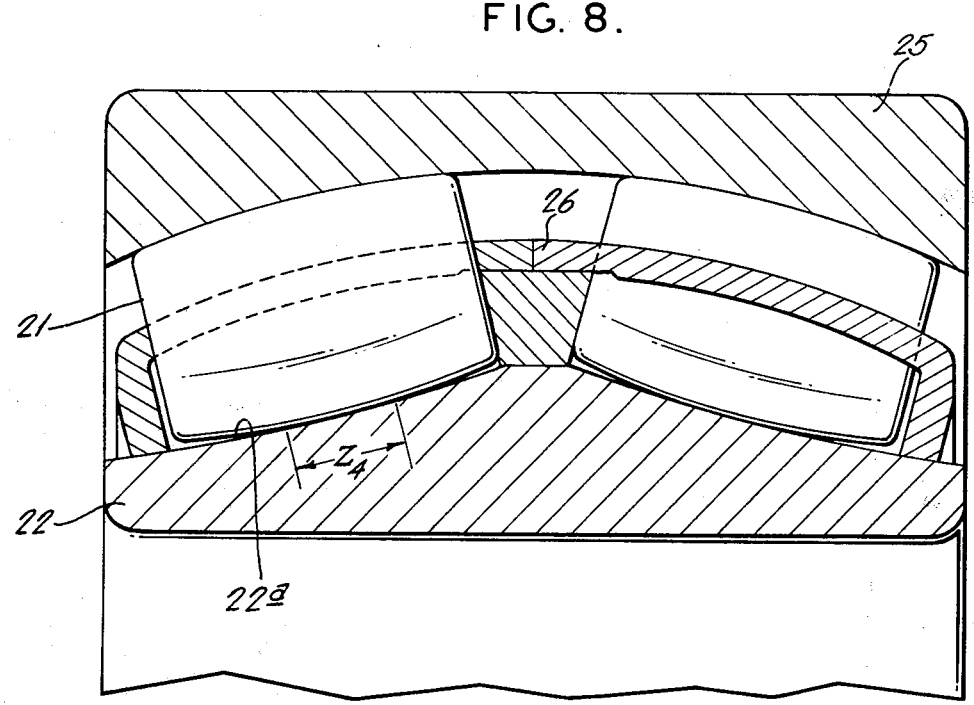

The simplest way of ensuring a predominance of the outer ring skew moment over the inner ring skew moment in a spherical roller bearing of the type illustrated in FIGS. 6 to 8 is to make the contact surface of the outer ring rougher than the corresponding surface of the inner ring. This gives rise to higher friction between the rollers and the outer ring, and hence, a higher skew moment.

The same result can be accomplished by a number of different structures. For example, the radius of curvature of the inner ring and/or the outer ring may be formed so that the radii are different and/or not constant.

One embodiment of bearing in accordance with the present invention is illustrated in FIG. 7 wherein the outer ring 15 has an inner surface 15a with a predetermined curvature in a plane through its axis of relative rotation. In the illustrated embodiment, the curvature of the raceway 15a conforms substantially with the curvature of the roller 11 adjacent the ends of the roller 11, so that the roller 11 engages the outer raceway 15a at spaced contact locations or zones $Z_1$ and $Z_2$. The outer raceway 15a has a peripheral groove or recess 15b providing a zone $Z_3$. The recess 15b may be provided by a radius of curvature which is less than the radius of curvature at the zones $Z_1$ and $Z_2$; or the groove 15b may be more pronounced and machined in the raceway 15a. The zone $Z_3$ is located intermediate the zones $Z_1$ and $Z_2$ adjacent the longitudinal median of the roller 11, and the peripheral surface of the roller 11 is spaced from the groove 15b so that the roller engages the outer raceway 15a at higher pressure than at its median. It is noted that in this embodiment, the radii of curvature of the outer surface 12a of the inner ring 12 and of the roller 11, are constant although it is desirable for the outer portions of the surface 12a to be chamfered slightly at 12b and 12c so that they diverge away from the median of the roller. The degree of chamfer is greatly exaggerated for purposes of illustration only. In this embodiment, a cage 16 which spaces the rollers 11 circumferentially is illustrated. With this structure, the skew moment created by the outer raceway 15a is equal to or predominates over the corresponding skew moment created by the inner raceway 12a for negative skew angles and therefore, during operation of the bearing the roller will assume a positive angle.

It may be desirable to effect the same skew control by means of still another structure. For instance, as seen in FIG. 8, the osculation between the inner raceway 22a and the roller 21 may be reduced. Osculation is defined as the ratio between the radius of curvature of the roller 21 and the radius of curvature of the raceway. When the osculation is small, the roller contacts the inner raceway only at about its median, a more concentrated area indicated in FIG. 8 as zone $Z_4$. In this embodiment, a cage 26 is illustrated, and the osculation is higher at the raceway of the outer ring 25. In addition, it is noted that the above definition of osculation does not apply when the radii of curvature of the contacting members are not constant. In such event, osculation is defined as the correspondence in shape of the profiles of the contacting bodies.

Figure 14:
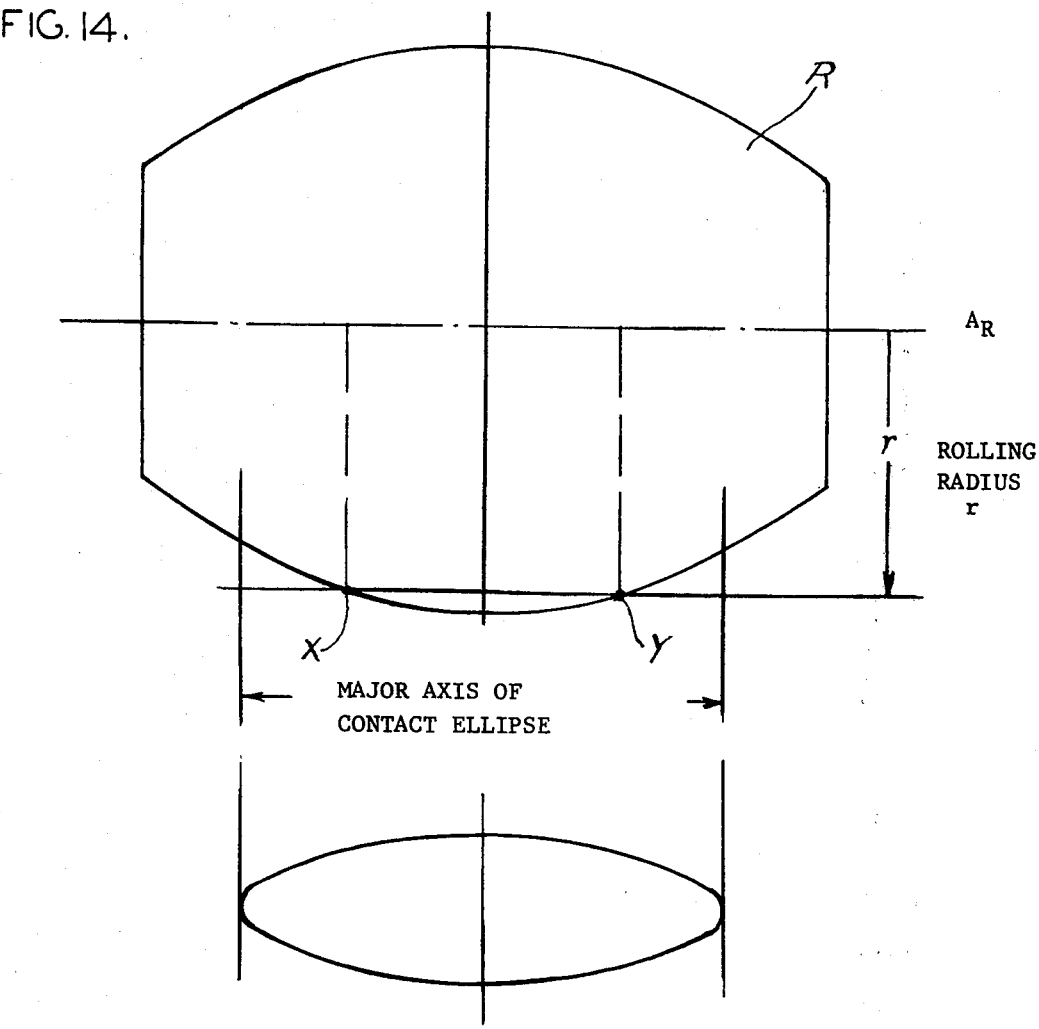
FIG. 14 is a schematic illustration of a roller showing the points of pure rolling.
Figure 15:
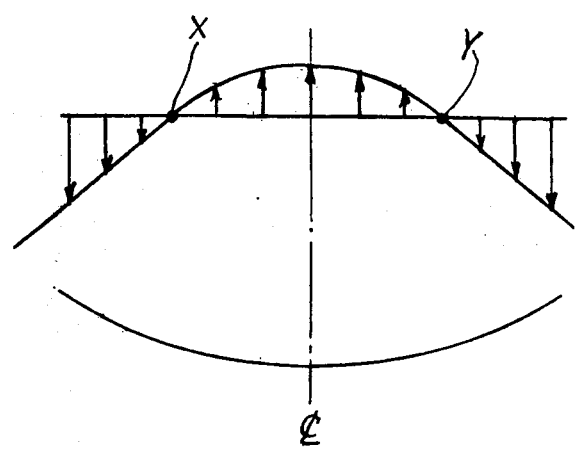
FIG. 15 is a schematic showing of the sliding forces in the roller of FIG. 14.

In order to develop in more specific detail the concept of skew and roller skew moments discussed above, consider first an ideal symmetrical spherical roller R loaded between two identical straight line raceways $R_1$ and $R_2$, and assume a typical osculation for the raceway and roller profiles of something slightly less than 100%. (See FIGS. 11 and 12.) Thus, the contact arcs of the roller R at the raceways $R_1$ and $R_2$ are two identical ellipses $E_1$ and $E_2$ having the same pressure distribution. (See FIG. 13.) Now, as the raceways $R_1$ and $R_2$ are moved in opposite directions relative to one another and the roller R rotates about its axis $A_R$ fixed in space, different points along the line of contact have different speeds in relation to the raceways, since the speed of a point on that line is related to the angular velocity of the roller R and the spacing of the point from the axis of rotation $A_R$ of the roller. The angular velocity of the roller R about its axis $A_R$ is constant; however, the spacing of the constant point from the roller axis varies along the length of the roller. As illustrated in FIGS. 3, 14 and 15, only two points X and Y on the curve can have pure rolling and all other points have a forwardly or rearwardly directed sliding motion depending on whether the distance of a given point on the curve from the axis is less than or greater than the corresponding distance r of the rolling points. Friction forces acting in the direction of the sliding motion arises at each contact point. It is noted that the sliding pattern between the roller and outer raceway is identical to the pattern at the inner raceway except the direction of the motions and forces is reversed.

The sliding pattern as illustrated in the present instance is symmetrical about the axis L (See FIG. 15) through the roller and therefore, no net friction moments arise around that axis at either raceway contact as a result of these motions.

Consider now a symmetrical spherical roller as above in an annular assembly as shown in FIG. 16. Since the raceways $R_3$ and $R_4$ are circumferential rather than straight line, the proportions and shape of the contact ellipses at the inner and outer raceways are altered, the outer ring contact ellipse $E_3$ becoming foreshortened and the inner ring contact ellipse $E_4$ becoming elongated (See FIG. 17). Thus, even though the axial spacing of the points of pure rolling is greater at the inner raceway as compared to the outer raceway, the sliding pattern in each contact is symmetrical about the axis L of the roller and therefore, there are no net friction moments tending to skew the rollers arising from the sliding patterns.

It is noted that the above analysis of a single row bearing is theoretical and as a rule the frictional sliding forces arising from the relative motion are not at all times precisely symmetrical in relation to the center of the roller in practice.

Consider now the sliding motion patterns and resulting frictional skew moments in a double row spherical roller bearing wherein the rollers are angularly oriented relative to the bearing axis. The general configuration of one of the rollers R in this type of bearing is shown in FIG. 18. In the absence of friction forces the geometry of the symmetrical roller R dictates that the nominal points of contact loading of the normal force $F_n$ remain diametrically opposed across the greatest diameter of the roller. The contact ellipses, although of the differing shapes shown in FIG. 17, will also be symmetrically disposed about these points. Thus, in the operation of the bearing, when the raceways are rotating in opposite directions, there are two points X and Y of rolling within each contact. (This contrarotation of the raceways is simply a device to permit the roller axis $A_R$ to be fixed in space to facilitate visualization of the contact friction effects). These points no longer lie at equal roller radii but must bear a conic relationship to each other, that is, the lines through the two points of nominal rolling in each of the two ring contacts with a roller converge to the point as illustrated wherein the roller axis $A_R$ intersects the bearing axis $A_b$ as shown in FIG. 18, and it is clear that the points are not symmetrical about the point of contact loading, i.e., the axis L through the roller.

Figure 19A:
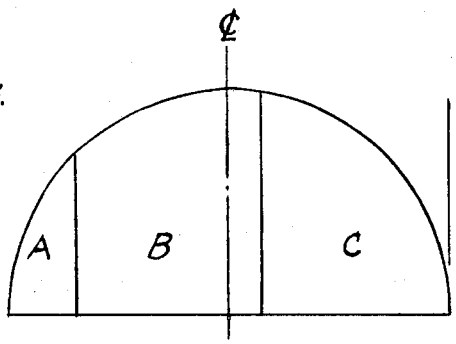
Figure 19B:
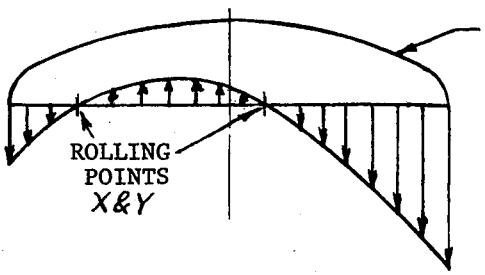
Figure 19C:
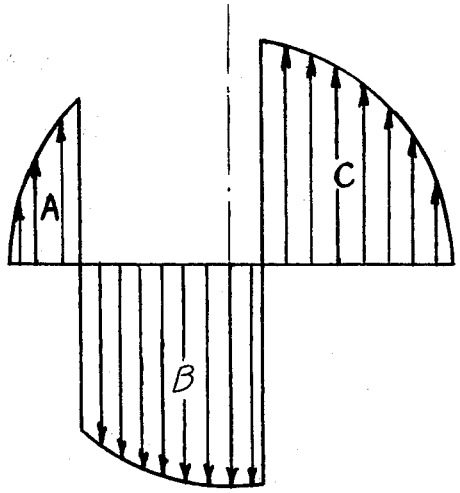
Figure 19D:
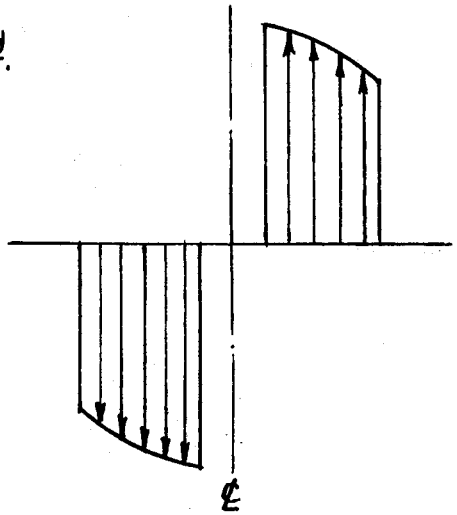

The general distribution of the relative sliding motions and the friction forces that they give rise to in each contact are as shown in FIGS. 19a and 19d inclusive. For illustration, assuming simply Coulomb friction conditions exist in the contact, then the friction force is proportional to the normal force and independent of the speed of sliding, but its direction is the same as the direction of the sliding motion. These forces are shown diagrammatically in FIG. 19c, region B being shown below the axis to indicate its opposite directional sense. By evaluating the moments of these forces about the axis L, those of region A balance or offset those of the extremity of region C and the forces of region B mutually offset one another on either side of the axis L. FIG. 19d shows those forces for which no counterbalance exists due to asymmetry of the sliding pattern. These forces therefore give rise to a friction moment that tends to skew the roller away from its normal contact rolling position. (FIG. 20 illustrates the frictional force patterns and the skew moments resulting therefrom). The skew moments from the two ring contacts on the same roller oppose one another. However, due to the effect of ring curvature on the contact shapes, (the elongated pattern of the inner ring contact ellipse and the foreshortened pattern of the outer ring contact ellipse) and the wider spacing of the points of rolling at the inner ring, the inner ring contact skew moment is greater, thus predominates and the roller skews to an angular position wherein its axis is not coplanar with but makes an angle with the axial plane of the bearing. The direction of skew just derived is termed "negative" according to a sign convention to be defined later.

Having traced the origin of friction moments which produce roller skew, let us now examine the effect of a negatively skewed roller on the balance of forces within a load carrying bearing. FIG. 21a shows the contact forces acting on the roller R in a plane passing through the axis $C_1$ and the bearing axis which contains both ring contacts. In FIG. 21a there is no skew. Only the normal contact forces $F_N$ act in the plane of the drawing. (The friction forces in the contacts are all perpendicular to this plane).

In FIG. 21b there is skew which will be defined as positive. In its contact with the outer ring, the roller rolls backwards into the plane of the drawing. Because of its skewed position, however, the direction of rolling motion is not perpendicular to the drawing plane. Rather, there is a component of rolling pointing away from the bearing midplane, since the outer ring can only move around its axis of rotation, its motion at the roller contact is precisely perpendicular to the drawing plane. Therefore, the ring surface must slip over the roller surface in a direction towards the bearing midplane, and this creates a friction force $F_T$ as shown, acting on the roller. Similar reasoning leads to the friction force $-F_T$ shown acting on the roller at the inner ring contact. Notice that the axial component $F_{TA}$ of the friction force $F_T$ acts in the same direction as the axial component $F_{NA}$ of the normal contact force $F_N$. Positive skew is defined to exist when these two forces act in the same direction; i.e., are codirectional. (Note also that the axial component $-F_{TA}$ on the raceway counteracts the axial component $F_A$ of the external load on that raceway. (See FIG. 22).

In FIG. 21c negative skew is shown. The axial component $F_{TA}$ of the friction force acts in the direction opposite to the axial component $F_{NA}$ of the normal contact force.

FIG. 22a shows the balance of forces on a section of the outer ring in contact with one roller. In FIG. 22a, there is no roller skew and the ring is under axial external load, of which the portion $F_A$ acts on the ring section considered.

The axial force on the ring segment is balanced by the axial component $-F_{NA}$ of the normal roller contact force $-F_N$ acting on the ring. (The normal contactt force acting on the roller is designated $+F_N$). The radial component $-F_{NR}$ of the roller contact force is balanced by the resultant of the two "hoop forces" $F_{H1}$ and $F_{H2}$ connecting the ring segment to adjacent ring elements.

In FIG. 22b the roller is positively skewed, and, per FIG. 21b, a friction force $-F_T$ acts on the outer ring as shown.

Here the axial force element $F_A$ is balanced by the sum of the axial component $-F_{NA}$ of the normal contact force $-F_N$ and the axial component $-F_{TA}$ of the friction force $-F_T$. As a result, $-F_N$ is reduced from its value in the unskewed conndition (illustrated by a dashed arrow in FIG. 22b.) So are the hoop forces $F_{H2}$ and $F_{H2}$.

In FIG. 22c the roller is negatively skewed and the friction force $-F_T$ acts in the direction opposite from that in FIG. 22b.

The normal contact force $-F_N$ and the hoop forces $F_{H1}$ and $F_{H2}$ are increased over the unskewed condition. (Illustrated by dashed arrows in FIG. 22c.)

FIGS. 23a and 24a show a similar analysis of the outer ring forces but this time under radial load, with radial external load $F_R$ acting on the ring section shown. There are no hoop forces in the ring, but an axial force $F_H$ arises between the two ring halves carrying the two rows of rollers. FIGS. 23a and 24a show the unskewed condition, FIGS. 23b and 24b positive skew, and FIG. 23c and 24c negative skew.

The addition of the friction forces changes the magnitude of the normal contact force $-F_N$ insignificantly. The only major change is the force $-F_H$ between the two ring halves.

FIGS. 22, 23 and 24 (a through c) demonstrate that positive roller skew creates significantly lesser normal contact forces in axially loaded bearings and insignificantly greater ones in radially loaded bearings. In radially loaded bearings within the conventional range of small bearing contact angles, the normal contact force will be insignificantly increased by positive roller skew when compared with zero skew. Negative skew operates for the opposite effect in all cases.

In bearings under a combination of axial and radial loads, the effect achieved by positive roller skew is to reduce normal contact forces whenever these arise predominantly from the axial load component. Due to the small contact angle of most two row spherical roller bearings, this is the case unless the axial load component is much smaller (say 1/5 or less) than the radial load component.

In a similar manner to purely axially loaded bearings, beneficial effects of positive roller skew are realized in bearings under all combinations of axial and radial loads. Whenever the normal contact forces are decreased, lower friction losses and longer fatigue life will result.

As of the time of the present invention, the art recognized that roller skew produces friction forces due to slip. However, conventional thinking also associated frictional forces of this type with increased bearing losses and reduced bearing life. Thus, prior art bearings were typically designed for zero skew under static conditions on the assumption that this would produce zero skew under dynamic conditions. Actually, in bearings so designed when operating under, for example, axial load conditions, the rollers are negatively skewed and the undesirable effects of the friction forces due to slip noted above were realized. Thus, by the present invention, one skilled in the art can design a bearing to operate within a precisely controlled range of non-negative skew for a given dynamic application. This clearly demonstrates that the prior art did not recognize that friction forces from slip could be used advantageously. It was against this background that the inventors discovered thatt friction forces from slkp can be used advantageously to provide an improved bearing if the friction forces are properly directed.

As illustrated in FIG. 25, derived from mathematical analysis of a typical spherical roller bearing under axial load, a minimum overall bearing frictional torque is obtained at small positive angles of roller skew.

In view of the foregoing, it should be apparent that a roller bearing assembly which possesses a maximum service life and a minimum of friction losses over the greatest range of axial and radial load conditions has now been provided.

This type of spherical roller bearing is provided by designing the cross sections of the raceways and the rolling members in such a manner as to cause the rolling elements to assume a non-negative skew angle within a prescribed range. As noted above, such a skew angle is ensured when the skew moment applied to the rolling members by the outer raceway is greater than the corresponding pivot moment applied by the inner raceway, when the skew angle is negative.

While preferred embodiments of the present invention have been describedd in detail with regard to spherical roller bearings, various modifications, alterations and changes may be made without departing from the spirit and scope of the present invention as defined in the appended claims. For instance, the invention may be utilizied in conjunction with other types of spherical roller bearings wherein the inner ring raceway is spherical and tapered roller bearings, cylindrical roller bearings and linear bearings.

We claim:

1. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause each rolling element at a predetermined position in the load zone to assume a non-negative skew angle within a predetermined angular range; said rolling element having a skew angle when the rolling element axis and the axis of the bearing are not coplanar and said skew angle being positive when the friction force components acting on said element in the axial direction and arising between said rolling element and either raceway arising in said contact zone are so directed that they are codirectional to the axial component of the normal force carried by said rolling element.

2. A bearing according to claim 1 wherein the moments and forces acting on the rolling elements during operation of the bearing are in a predetermined relation to cause the rolling elements to assume a non-negative skew angle within a predetermined angular range.

3. A bearing according to claim 1 wherein the raceway contact zone tending to induce positive skew to the rolling elements has a higher coefficient of friction with respect to the rolling elements than said other raceway contact zone.

4. A bearing according to claim 1 wherein the non-negative skew angle of the rolling elements is achieved by providing the raceways with predetermined profiles.

5. A spherical roller bearing according to claim 4 wherein at least one of said raceways does not have a profile characterized by a constant radius of curvature.

6. A bearing according to claim 1 wherein non-negative skew is induced by providing a recess in the contact zone of the raceway tending to induce positive skew intermediate the ends of said rolling elements.

7. A bearing according to claim 1 wherein non-negative skew is induced by providing a relief in the contact zone of the raceway tending to induce negative skew, said relief being located adjacent to at least one of the ends of said rolling elements.

8. A bearing according to claim 1 wherein non-negative skew is induced by providing a relief in the contact zone of one of said raceways tending to induce negative skew, said relief being located adjacent to each end of said rolling element.

9. A bearing according to claim 1 wherein the profile of the raceway tending to induce positive skew conforms more closely to the profile of the rolling element than does the other raceway.

10. A bearing according to claim 1 wherein means is provided for circumferentially spacing said rolling elements and for angularly limiting said rolling element in said annular space.

11. A spherical roller bearing comprising: inner and outer members having confronting raceway surfaces defining an annular space and a plurality of rolling elements contained in said annular space and each having a peripheral surface, an adjacent pair of said surfaces having predetermined configurations providing therebetween contact zone means for causing a pivot moment applied to the rolling elements by one member tending to induce positive skew to the rolling elements to be at least equal to the corresponding moment applied by the other member tending to induce negative skew and whereby said rolling elements have a skew angle when the rolling element axis and the axis of the bearing are not coplanar and said skew angle being positive when the friction force components acting on said element in the axial direction and arising between said rolling element and either raceway arising in said contact zones are so direction that they are codirectional to the axial component of the normal force carried by said rolling element.

12. A spherical roller bearing according to claim 11 wherein said contact zone means is located between said rolling element surface and said outer raceway surface.

13. A spherical roller bearing according to claim 12 wherein said contact zone means has a region intermediate the ends of the rolling elements wherein the rolling element surface is spaced from the outer raceway surface.

14. A spherical roller bearing according to claim 11 wherein said contact zone means is located between said rolling elements and said inner raceway surface inboard of the ends of said rolling elements.

15. A spherical roller bearing according to claim 14 wherein said inner raceway surface is spaced from the rolling element surface adjacent the ends of the rolling element to locate said contact zone means at said inboard location.

16. A spherical roller bearing according to claim 11 wherein said one member is the outer member and said outer member is the inner member.

17. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause each rolling element at a predetermined position in the load zone to assume a positive skew angle within a predetermined angular range; said rolling elements having a skew angle when the axis of a rolling element and the axis of the bearing are not coplanar and said skew angle being positive when the friction force components acting on said element in the axial direction, arising in each contact between said rolling element and raceways, are so direction that they are codirectional to the axial component of the normal contact force acting on said rolling element in the same contact.

18. A bearing comprising relatively moveable members having confronting raceways spaced apart to define a space, a plurality of rolling elements in the space between the raceways, said rolling elements adapted to engage said members at respective raceway contact zones, and means operable during operation of the bearing to cause each rolling element at a predetermined position in the load zone to assume a non-negative skew angle within a predetermined angular range; said rolling elements having a skew angle when the axis of the rolling element is not orthogonal to the direction of motion of one said raceway with respect to other said raceway, said skew angle being positive when the friction force on said one raceway and arising in the contact between said rolling element and said one raceway acts in a direction counteracting the non-normal component of the external load acting on said one raceway.

19. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing under load to skew the rolling elements within a predetermined non-negative angular range, whereby frictional forces resulting from local sliding in said contact zones produce moments which are equal and opposite, said rolling elements having a skew angle when the axis of a rolling element and the axis of the bearing are not coplanar and said skew angle being positive when the friction force components acting on said element in the axial direction arising in each contact between said rolling element and raceways, are so directed that they are codirectional to the axial component of the normal contact force acting on said rolling element in the same contact.

20. A bearing as claimed in claim 19 wherein the skew angle of said rolling elements is in a positive range of less than about 2°.

21. Roller bearing comprising an outer ring, an inner ring and intermediate rollers characterized by means operable during operation of the bearing under load whereby the moments caused by asymmetric friction forces on the rollers cause their axes to deviate from planes through the axis of the bearing and in a direction which causes the axial friction force component between the rollers and the raceways which arise due to the skewing to counteract the axial load on the bearing.

22. A bearing comprising inner and outer members having inner and outer raceways spaced apart to define an annular space, a plurality of rolling elements in the annular space between the raceways, said rolling elements adapted to engage said members at inner and outer raceway contact zones, means operable during operation of the bearing under load to skew the rolling elements within a predetermined non-negative angular range, whereby the algebraic sum of all moments acting on a rolling element taken about an axis transverse to the axis of said rolling element and intersecting the bearing axis is equal to zero when the skew angle is non-negative, said rolling elements having a skew angle when the axis of a rolling element and the axis of the bearing are not coplanar and said skew angle being positive when the friction force components acting on said element in the axial direction arising in each contact between said rolling element and raceways, are so directed that they are codirectional to the axial component of the normal contact force acting on said rolling element in the same contact.

23. A bearing comprising inner and outer members spaced apart to define an annular space, a plurality of rolling elements in the annular space between the raceways, said rolling elements engaging said members at inner and outer raceway contact areas, said rolling elements and raceways being of a predetermined relative profile whereby each rolling element at a predetermined position in the load zone contacts one of said raceways along a continuous area extending substantially the entire length of the rolling element and contacts the other raceway along an area wherein pressure applying relation is greater adjacent the median of said rolling element than outboard of the median whereby the rolling element assumes a non-negative skew angle, said rolling element having a skew angle when the rolling element axis and the axis of the bearing are not coplanar and said skew angle being positive when the friction force components acting on said element in the axial direction arising in each contact between said rolling element and raceways, are directed that they are codirectional to the axial component of the normal contact force acting on said rolling element in the same contact.

24. A bearing comprising inner and outer members spaced apart to define an annular space, a plurality of rolling elements in the annular space between the raceways, said rolling elements engaging said members at inner and outer raceway contact areas, said rolling elements and raceways being of a predetermined relative profile whereby each rolling element at a predetermined position in the load zone contacts both raceways adjacent to the median of the rolling elements, and wherein the pressure applying relation between the rolling element and one of said raceways is less adjacent the median than outboard thereof whereby the rolling element assumes a non-negative skew angle, said rolling element having a skew angle when the rolling element axis and the axis of the bearing are not coplanar and said skew angle being positive when the friction force components acting on said element in the axial direction arising in each contact between said rolling element and raceways, are so directed that they are codirectional to the axial component of the normal contact force acting on said rolling element in the same contact.

25. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cuase each rolling element at a predetermined position in the load zone to assume a non-negative skew angle within a predetermined angular range, said angular range being selected so that the overall frictional losses from said rolling elements are at or close to a minimum, for bearings operating under a load having a substantial axial component, said rolling element having a skew angle when the axis of a rolling element and the axis of the bearing are not coplanar and said skew angle being positive when the friction force components acting on said element in the axial direction arising in each contact between said rolling element and raceways, are so directed that they are codirectional to the axial component of the normal contact force acting on said rolling element in the same contact.

26. A bearing comprising inner and outer members having inner and outer raceways spaced apart to define and annular space, a plurality of rolling elements in the annular space between the raceways, said rolling elements adapted to engage said members at inner and outer raceway contact zones, and means operable during operation of the bearing to cause each rolling element at a predetermined position in the load zone to assume a skewed position of predetermined angular range; said rolling elements being skewed and having a skew angle when the rolling element axis and the axis of the bearing are not coplanar and said skew direction and angle being predetermined by the requirement that they cause the friction forces acting on said element in the contacts arising between the rolling elements and both raceways to reduce the normal contact forces acting on the rolling element below that magnitude which obtains when the rolling element is unskewed.

27. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause each rolling element at a predetermined position in the load zone to assume a positive skew angle within a predetermined angular range; said rolling elements having a skew angle when the rolling element axis and the axis of the bearing are not coplanar and said skew angle being positive when the axial friction force component on the raceway arising between said rolling element and raceway in said contact zone is so directed that it counteracts the axial load component carried by said bearing.

28. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause each rolling element at a predetermined position in the load zone to assume a positive skew angle within a predetermined angular range; said rolling elements having a skew angle when the rolling element axis and the axis of the bearing are not coplanar and said skew angle being positive when the axial component of the friction force acting on said element in a contact arising between said rolling element and either raceway is codirectional with the axial component of the normal force on the rolling element, the raceway tending to induce positive skew to the rolling elements having a higher coefficient of friction with respect to the rolling elements than said other raceway.

29. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing to cause each rolling element at a predetermined position in the load zone to assume a skewed position of predetermined direction and having a skew angle within a predetermined angular range; said rolling elements being skewed and having a skew angle when the rolling element axis and the axis of the bearing are not coplanar and said skew direction and angle being predetermined by the requirement that they cause the friction forces acting on said element in the contacts arising between the rolling elements and both raceways to reduce the normal contact forces acting on the rolling element below that magnitude which obtains when the rolling element is unskewed, the raceway tending to skew the rolling elements in a direction to increase the normal contact forces acting on the rolling element having a lower coefficient of friction with respect to the rolling elements than said other raceway.

30. A bearing comprising inner and outer members having inner and outer raceways spaced apart to define an annular space, a plurality of rolling elements in the annular space between the raceways, said rolling elements adapted to engage said members at inner and outer raceway contact zones, and means operable during operation of the bearing when subjected to an external load having an axial component applied to one of said raceways operable to cause each rolling element at a predetermined position in the load zone to assume a positive skew angle within a predetermined angular range; said rolling elements having a skew angle when the rolling element axis and the axis of the bearing are not coplanar and said skew angle being positive when the axial component of the friction force on said raceway and arising in the contact between said rolling element and said one raceway acts in a direction counteracting the axial component of the external load acting on said one raceway.

* * * * *

UNITED STATES PATENT AND TRADEMARK OFFICE
CERTIFICATE OF CORRECTION

PATENT NO. : 3,990,753

DATED : November 9, 1976

INVENTOR(S) : Erik Magnus Kellstrom and leif Sigvard Blomqvist

It is certified that error appears in the above–identified patent and that said Letters Patent are hereby corrected as shown below:

In the cover page

Insert:    —[30] FOREIGN APPLICATION PRIORITY DATA
July 7, 1972 [SE]  Sweden....8997/1972—

In the specification

Col. 1, line 39; delete "bearings" and insert —bearing—
Col. 2, line 11; delete "substract" and insert —subtract—
Col. 2, line 31; after "below" delete "the" and insert —that—
Col. 4, line 23; after "sliding" insert —speed—
Col. 4, line 28; delete "distribted" and insert —distributed—
Col. 4, line 41; delete "shew" and insert —skew—
Col. 4, line 54; delete "position" and insert —positive—
Col. 5, line 16; after "bearing" insert —such—
Col. 5, line 28; after "friction" insert —force—
Col. 5, line 32; after "axial" insert —load—
Col. 6, line 35; delete "ares" and insert —areas—
Col. 6, line 47; delete "constant" and insert —contact—
Col. 7, line 45; delete "simply" and insert —simple—
Col. 8, line 49; delete "contactt" and insert —contact—
Col. 9, line 54; delete "thatt" and insert —that—
Col. 9, line 54; delete "slkp" and insert —slip—

UNITED STATES PATENT AND TRADEMARK OFFICE
CERTIFICATE OF CORRECTION

PATENT NO. : 3,990,753
DATED : November 9, 1976
INVENTOR(S) : Erik Magnus Kellstrom and Leif Sigvard Blomqvist It is certified that error appears in the above-identified patent and that said Letters Patent is hereby corrected as shown below:

In the claims

Claim 11, line 24; delete "direction" and insert -directed-
Claim 16, line 47; delete "outer" and insert -other-
Claim 17, line 63; delete "direction" and insert -directed-
Claim 23, line 21; after "are" insert -so-
Claim 30, line 10; after "said" insert -one- Signed and Sealed this Sixth Day of August 1985

[SEAL]

Attest:

DONALD J. QUIGG

Attesting Officer   Acting Commissioner of Patents and Trademarks